United States Patent [19]

Rydén et al.

[11] 4,122,310

[45] Oct. 24, 1978

[54] SPACE STAGE IN A PCM-EXCHANGE

[75] Inventors: Lars Ola Rydén, Johanneshov; Karl Olof Ingmar Andersson, Ektorp, both of Sweden

[73] Assignee: Telefonaktiebolaget L M Ericsson, Stockholm, Sweden

[21] Appl. No.: 785,415

[22] Filed: Apr. 7, 1977

[30] Foreign Application Priority Data

Apr. 30, 1976 [SE] Sweden .............................. 7605008

[51] Int. Cl.$^2$ .............................................. H04J 3/00
[52] U.S. Cl. ................................................ 179/15 AT
[58] Field of Search ........ 179/15 AT, 15 AQ, 15 AP, 179/18 EA, 18 GF

[56] References Cited

U.S. PATENT DOCUMENTS

| 3,632,883 | 1/1972 | Aagaard | 179/15 AQ |
| 3,715,505 | 2/1973 | Gordon | 179/18 GF |
| 4,034,159 | 7/1977 | Buron | 179/15 AT |
| 4,035,584 | 7/1977 | Lurtz | 179/15 AT |

Primary Examiner—Kathleen H. Claffy
Assistant Examiner—Joseph A. Popek
Attorney, Agent, or Firm—Hane, Roberts, Spiecens & Cohen

[57] ABSTRACT

PCM words transmitted on a number of incoming and outgoing links during time slots according to a time division multiplex system are space interchanged by utilizing a circulating shift register wherein at the beginning of their allotted time slots, each of incoming PCM words is registered each in an associated shift register stage. The circulating shift register is stepped by a clock pulse so fast that each PCM word is stepped through all shift register stages during the respective time slot. Control words, each associated with one of the time slots and with one of the outgoing links, determine during which clock pulse an outgoing link is connected to the output of its associated shift register stage. A buffer memory arranged between the circulating shift register and the outgoing links re-establishes the correct time division multiplex system for the outgoing PCM words.

3 Claims, 1 Drawing Figure

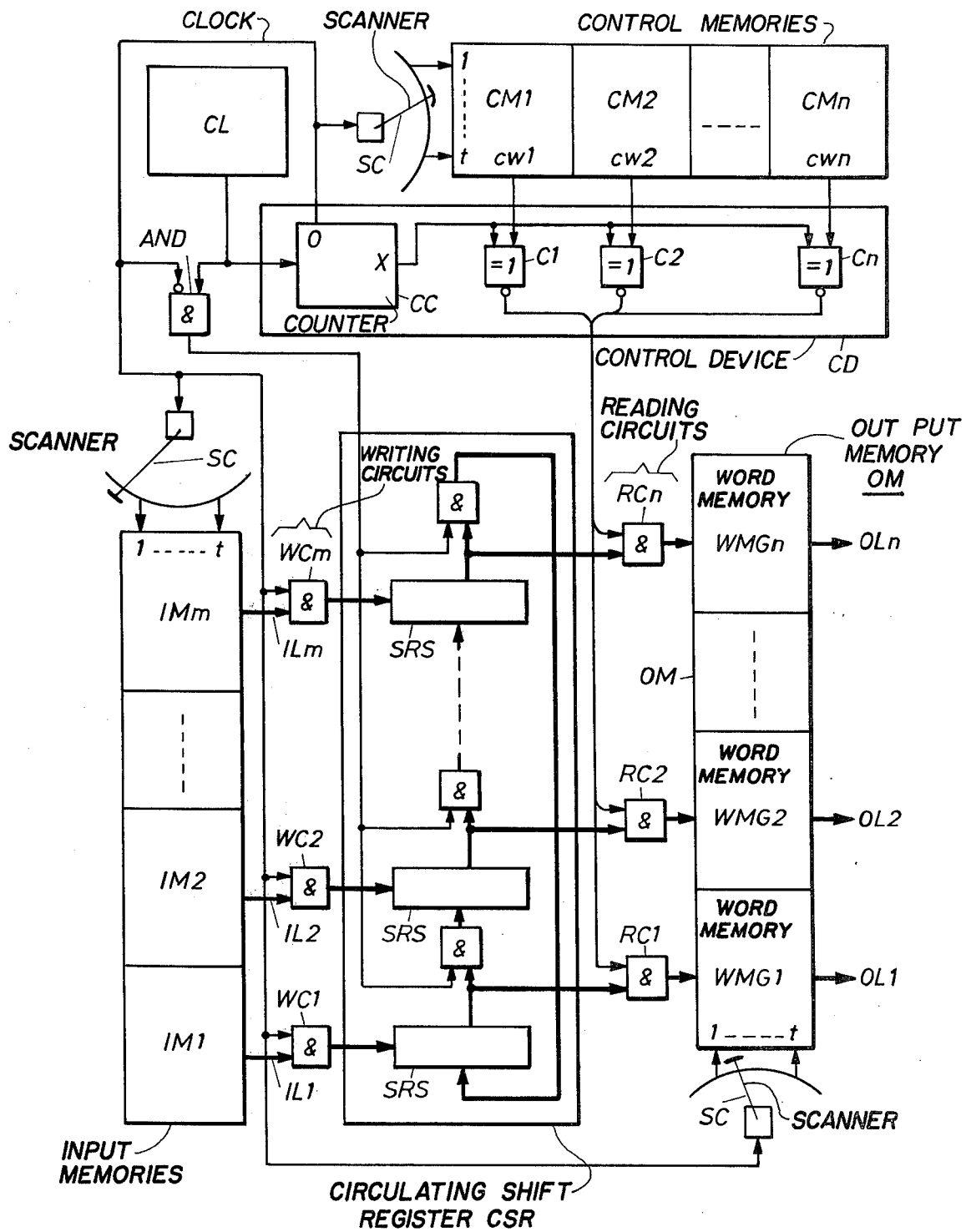

SPACE STAGE IN A PCM-EXCHANGE

The present invention refers to a space stage in a PCM-exchange. The space stage includes links on which PCM-words arrive and depart synchronously in a fixed-cycle operation determining time slots in a time-division multiplex system. Furthermore, the space stage is arranged to switch, during sequential time slots, the incoming PCM-words to outgoing links by means of control information words received synchronously with the PCM-words from the exchange.

It is known, for example from the Swedish Patent No. 7413086-5, to switch PCM-words only by means of time interchanges, that is without space interchanges because hitherto it had been considered to be more difficult to realize space interchanges than time interchanges. By PCM-word switching is meant that a word which is arriving on an arbitrary link during an arbitrary time slot of an incoming time-division multiplex system is transferred to an arbitrary outgoing link on which the word is transmitted during an arbitrary time slot of an outgoing time-division multiplex system. By time interchanges it is meant that the words unrestrictedly are moved by means of time stages from incoming to outgoing time slots, but that it is invariably determined how the incoming links of the time stage are connected to the outgoing links of the time stage. By space interchanges it is meant that the words unrestrictedly are moved by means of a space stage from their incoming to their outgoing links, but that the time relations are invariably determined. A space stage is avoided by introducing a time-division multiplex system which gathers all PCM-words in one single link. The above-cited Swedish patent describes a time-time switching principle according to which incoming and outgoing time stages are interconnected by means of said single link.

Hitherto known space stages have the disadvantage of containing gate matrices. The incoming and outgoing links of the space stage form a coordinate system the crossing points each of which being provided with a gate device. The matrix is controlled by the central unit of the exchange in order to achieve, in its activated state during an actual time slot, a space interchange, that is a connection through the links connected to the gate device. If such a space stage comprises $m$ incoming an $n$ outgoing links ($m < n$ gives expansion, $m > n$ gives a concentrator effect) the associated gate matrix comprises $m \cdot n$ gate devices which must be controlled synchronously in a fixed-cycle operation determined by means of the time-division multiplex system chosen for space interchange. In many known embodiments, a separate telecommunication system is needed between the central unit and the gate matrix with a control connection for each gate device. In order to avoid such a complex control system it is proposed in the Swedish patent No 354764 to supply the incoming and outgoing links of the space stage with control information as link addresses which are compared between themselves in the crossing points of the coordinate system. Each crossing point includes in addition to the gate device an address comparison arrangement which controls the gate device. Such complicated control connections are removed but the transmission capacity for PCM-words is reduced due to the control information which further loads the links. In order to compensate this reduction of information capacity the coordinate system and also the number of crossing points must be increased.

It is an object of the present invention is to carry out space interchanges completely without using gate matrices. The space stage according to the invention which is controlled without resulting in said reduction of the transmission capacity can be used not only for all PCM-switching principles which comprise space interchanges but also with the time stages described in Swedish Patent No. 7,413,086-5, if, owing to too high timing frequencies, technical problems arise when utilizing a single link in the transfer of all the PCM-information.

The invention, the characteristics of which appear from the appended claim will be described below with reference to the accompanying single-figured drawing whose heavy lines indicate the links of the space stage for the one-way transfer of PCM-words.

The space interchanges are carried out by means of a circulating shift register CSR known per se. Each of the stages of the shift register SRS is arranged to register a store PCM-word. The drawing only shows those shift register stages which receive the PCM-words either from an associated writing-circuit WC1-WC$m$ or from the preceding (with consideration taken to the circulating shifting) shift register stage and which transmit the PCM-words to an associated reading-circuit RC1-RC$n$ and to the following (with consideration taken to the circulating shifting) shift register stage. Such is the case if $m = n$, that is if the space stage comprises as many incoming as outgoing links IL1-IL$m$ and OL1-OL$n$. The expansion or concentrator effect is obtained by means of shift register stages without an associated writing or reading circuit.

A clock pulse source CL generates pulses for the shifting of the shift register CSR and for the stepping forward of a circulating counter CC which is part of a control device CD. By means of AND-gate AND those shift pulses, which coincide with zero-pulses coming from the output O of counter CC are cancelled in order to activate the writing circuits WC1-WC$m$.

Each time slot in the time-division multiplex system of the space stage begins with a zero pulse during which all the PCM-words arriving on the incoming links IL1-IL$m$ pass via the activated writing circuits WC1-WC$m$ to be registered in the shift register CSR. In an unactivated state the reading circuits RC1-RC$n$ prevent the PCM-words from being transferred to an output memory OM. The counter CC which counts the shift pulses following the zero-pulse comprises at least as many counting stages as there are shift register stages so that all PCM-words which are received during the zero-pulse are shifted through all shift register stages before the counter generates the next zero-pulse.

The control device CD comprises the comparators C1-C$n$ each of which is associated with a reading circuit is symbolized by negating exclusive OR-gate devices. The comparators receive on their first inputs the position word of the counter and on their second inputs control-information words $cw1-cwn$ which are generated by the central unit of the exchange and which are associated with the actual time slot and the respective reading circuit. The reading circuits RC1-RC$n$ are activated when the instantaneous position word corresponds to the respective control information word. This information word contains the number of shift pulses required during an actual time slot before one of the PCM-words registered at the beginning of the time slot in the shift register is transferred to said output memory OM. By means of the circulating shifting it is rendered possible to transfer an arbitrary incoming PCM-word to an arbitrary reading circuit. Thus, arbitrary space interchanges are rendered possible during each time slot of the time-division multiplex system.

Output memory OM, which comprises word memories WMG1-WMGn each having an input connected to one of the reading circuits RC1-RCn and an output connected to one of the outgoing links OL1-Ol n, is arranged to re-establish the fixed-cycle operation in spite of the fact that PCM-words belonging to different time slots appear, due to space interchanges, irregularly on the outputs of the reading circuits. In the present embodiment word memory groups WMG1-WMGn are cyclically activated for writing by means of a scanning arrangement SC and by means of the zero-pulses. A scanning cycle extends over a frame of the time-division multiplex system, each frame comprising $t$ time slots. The PCM-words are buffer stored until they are synchronously transmitted the outgoing links OL1-OLn according to a known and on not shown technique.

In order to symbolize that the space stage works in synchronism with the time-division multiplex system, input memories IM1-IMm connected to the incoming links IL1-ILm are shown in the drawing as well as control memories CM1-CMn connected to the comparators C1-Cn. Those memories are activated for reading in synchronism with the activation for reading of the output memory OM by means of the scanning arrangement SC. The control memories CM1 to CMn the control information for the whole space stage. The control information comprises $t \cdot n$ control information words which the central unit of the exchange computes and writes in the respective places of the control memories. Each control information word belongs to an ordered speech connection and determines the space interchanges which are performed once per time-division multiplex frame as long as the respective call lasts. The connections through the space stage are disconnected, for example, by means of transmitting to the control memories such words which never can correspond to the position words generated by the circulating counter CC.

We claim:

1. In a PCM-exchange including incoming links and outgoing links wherein PCM-words arrive on the incoming links and depart on outgoing links in a fixed-cycle operation during time slots in a time-division multiplex system under control of control words indicating desired outgoing links arriving in synchronism with the PCM-words, the improvement comprising: a space stage for connecting the incoming links to the outgoing links comprising: a recirculating shift register having a plurality of shift register stages, each of said stages having an internal input and an internal output, the internal output of each shift register stage being connected to the internal input of an adjacent shift register stage whereby the recirculating shift register stages form a closed loop, and each of said stages having an external input and an external output; a plurality of controllably operated writing circuits, each of said writing circuits having an input connected to one of the incoming links and an output connected to the external input of one of the stages of said recirculating shift register; a plurality of controllably operated reading circuits, each of said reading circuits having an input connected to the external output of one of the stages of said recirculating shift register and an output; connecting means for connecting the outputs of said reading circuits to the outgoing links; a clock pulse means for generating shift pulses for stepping said recirculating shift register with a frequency such that every PCM-word in a time slot can be shifted through a plurality of stages of said recirculating shift register during the elapsed time for the time slot; means for connecting said writing circuits to said clock pulse means so that one of the pulses generated by said clock pulse means during each time slot activates said writing circuits to write PCM-words from the incoming links into the associated stages of the recirculating shift register; control means connected to said clock pulse means and receiving the control words of the time slot for selectively activating each of said writing circuits during particular shift pulses occurring during the time slot as indicated by the control words whereby the PCM-words in the stages of the recirculating shift register are transferred via said connecting means to the desired outgoing links.

2. The space stage of claim 1 wherein said clock pulse means generates during each time slot a number of shift pulses so that every PCM-word in the slot can be shifted through every stage of said recirculating shift register.

3. The space stage of claim 2 wherein said connecting means is a buffer memory means for phasing the PCM-words.

* * * * *